S. A. CLOWES.
DIE.
APPLICATION FILED MAR. 7, 1913.

1,071,702.

Patented Sept. 2, 1913.

WITNESSES:

SUMPTER A. CLOWES.
INVENTOR.

BY

ATTORNEY.

COLUMBIA PLANOGRAPH CO., WASHINGTON, D. C.

UNITED STATES PATENT OFFICE.

SUMPTER A. CLOWES, OF PITTSBURGH, PENNSYLVANIA.

DIE.

1,071,702.  Specification of Letters Patent.  Patented Sept. 2, 1913.

Application filed March 7, 1913. Serial No. 752,683.

*To all whom it may concern:*

Be it known that I, SUMPTER A. CLOWES, a citizen of the United States, residing at Pittsburgh, in the county of Allegheny and State of Pennsylvania, have invented certain new and useful Improvements in Dies, of which the following is a specification.

My present invention relates to improvements in dies, and is particularly designed for use in cutting threads upon bolts, pipes and other devices.

The object of the invention is the provision of a die, to be used in connection with a drill press or analogous machine, equipped with means by which the dies may be operated with simplicity and accuracy in their movements toward or away from the work.

The invention consists in certain novel features of construction and combinations and arrangements of parts as hereinafter pointed out and more specifically set forth in the claims.

In the accompanying drawings I have illustrated one complete example of the physical embodiment of my invention constructed according to the best mode I have so far devised for the practical application of the principles of the invention.

Figure 1:
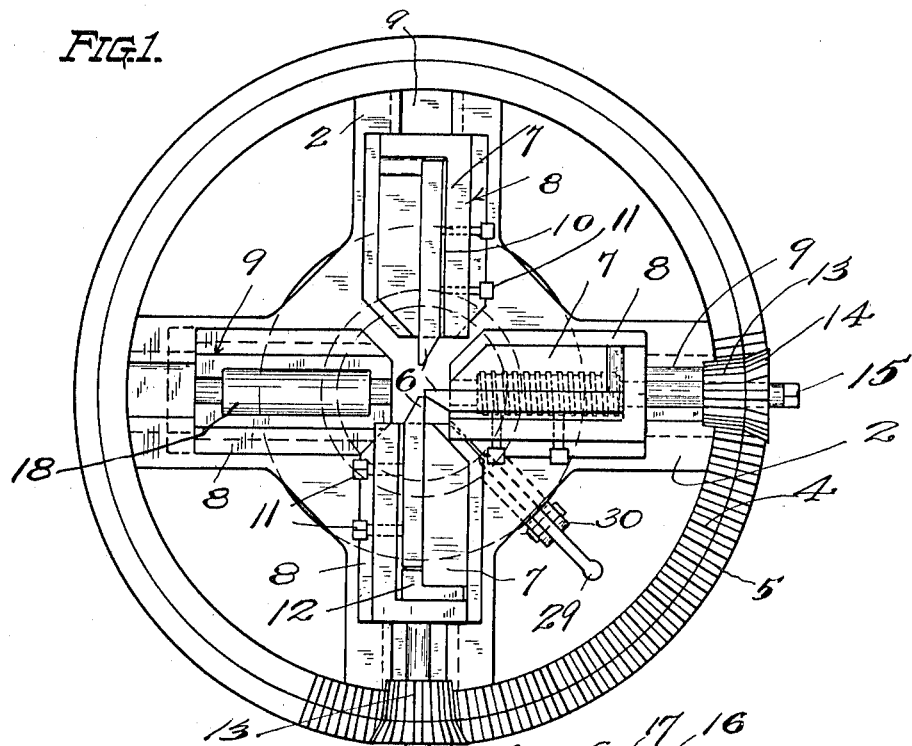
Figure 2:
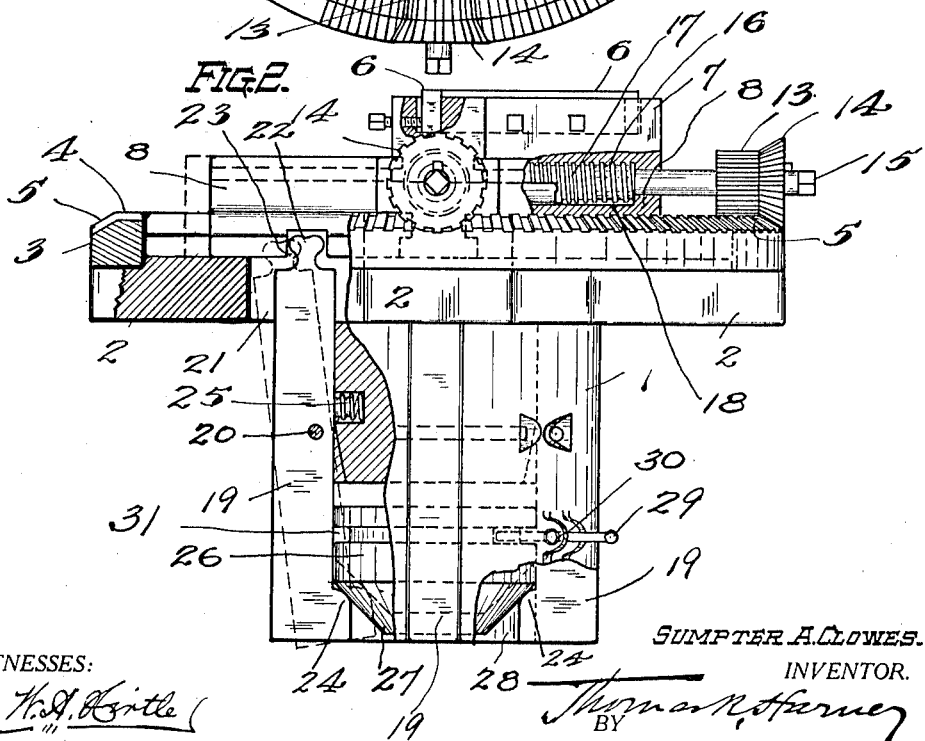

Figure 1 is a top plan view of the device showing accommodations for four dies, but illustrating only three, one of which is withdrawn from operative position, and other parts being omitted for convenience of illustration. Fig. 2 is a side elevation of Fig. 1, partly in section, and with some parts omitted for convenience of illustration.

In the preferred embodiment of my invention I employ the supporting head 1 which is cylindrical in cross section and formed with integral, diametrically arranged radial arms 2, upon which is arranged to revolve, the integral circumferential band 3. The band 3 is provided with a toothed rack having the horizontal portion 4 and beveled part 5.

In the drawings I have illustrated the device as provided with four cutting tools, dies, or chasers as 6, and inasmuch as the construction and operation of each is identical, the description of one will suffice for all. The cutting tools 6 are each held by means of a spacing block 7 and set screws 11 in the carrier block 8, the spacing block being slidable in the carrier and the carrier in turn being slidable in the arm 2. The arm 2 is provided with a dovetail slot 9 in which the wings or side flanges of the block 8 are guided, and the block 8 has dovetailed slots for the accommodation of the wings or side flanges of the head block 7.

The cutting tools or dies are adjustably held in slots 10 in the carrier block 8 by means of the set screws 11, and in event of wear on the dies and shortening thereof due to repeated sharpening, a filler block 12 may be inserted in the slot 10 to take up outward pressure on the die.

The cutting tool, its block 7 and the carrier block 8 may be caused to move toward or recede from the center of the device by means of rack wheels 13 and 14, the former meshing with the horizontal rack 4 and the latter with the beveled rack 5. These rack wheels are fixed on the pintle or shaft 15, and the shaft is provided with a threaded portion 17 which engages a threaded bore 16 in the block 7. The carrier block 8 is provided with a hemispherical groove 18, complementary to the threaded portion 17, but not threaded, to accommodate the lower half of the screw shaft 17. From this construction and description it will be seen that the rotation of the shaft 15 with its rack wheels 13 and 14 in mesh with the racks 4 and 5 will cause the shaft to revolve, and through the screw 17 and the threaded block 7, the cutting tool or die is moved toward or from the center of the device.

In order to quickly withdraw the dies or cutting tools from working position, I provide a cam lever 19 for each carrier block 8. The lever 19 is pivoted at 20 in the supporting head 1, projects up through an opening 21 in the arm 2, and its head 22 engages in a recess 23 in the under side of the carrier block 8. At its lower end a cam shoulder 24 is provided on the lever 19, and at the opposite side of the fulcrum 20 a spring 25 incased in a recess in the head 1, urges the lever outwardly at its upper end. The lower end of the lever is positively moved outward by means of the cam block 26. This block is provided with a conical or tapered head 27 that engages the shoulder 24 of the lever, and the block is movable within a cylindrical passage 28 in the lower end of the head 1.

An operating lever 29 pivoted in ears at 30, engages in an annular slot 31 in the cam block 26, and by movement of this lever 29 it will be understood that the block may be caused to slide in its passage, the downward movement of the block and the engagement of its tapered or cam head with the shoulder 24 causing the lower end of the lever 19 to swing outwardly. This movement causes the tool carrier block 8 to be moved inward toward the center of the device. The reverse movement of the cam block permits the spring 25 to force the upper end of the lever 19 outwardly, thus causing the tool to recede from the center.

The rack wheel 13, it will be observed, is wider than the rack 4, to permit movement of the rack wheel 13 (to the right for instance in Fig. 1) without disengagement from the rack 4.

Having thus fully described my invention, what I claim as new and desire to secure by Letters Patent is:—

1. The combination with a supporting head having radial arms, of an open ring formed with rack teeth, a carrier block movable in each arm, a spacing block movable relative to the carrier block and a cutting tool carried by said blocks, a threaded shaft engaging the spacing block but freely revoluble in the carrier block, and a gear wheel on the shaft engaging the rack teeth.

2. The combination with a supporting head having radial arms and a rack ring, of a series of carrier blocks each having a recess, a lever engaged in each recess and means for moving said levers to simultaneously retract said carrier blocks, a spacing block movable relative to each carrier block, and a cutting tool, a threaded shaft revoluble in the carrier block but operatively engaging the head block, and a gear wheel on the shaft engaging said ring.

In testimony whereof I affix my signature in presence of two witnesses.

SUMPTER A. CLOWES.

Witnesses:
W. A. HIRTLE,
JOHN F. SWEENY.

---

Copies of this patent may be obtained for five cents each, by addressing the "Commissioner of Patents, Washington, D. C."